United States Patent Office 3,539,532
Patented Nov. 10, 1970

3,539,532
CURABLE POLYEPOXIDE COMPOSITIONS
James R. Harvey, Somerville, N.J., assignor to Union Carbide Corporation, a corporation of New York
No Drawing. Filed Jan. 16, 1968, Ser. No. 698,117
Int. Cl. C08g 30/12, 30/14
U.S. Cl. 260—47                                            8 Claims

ABSTRACT OF THE DISCLOSURE

This invention relates to curable, homogeneous polyepoxide compositions, containing an acid anhydride curing agent and piperidine as an accelerator which are relatively stable at room temperature and, when cured, are characterized by excellent physical, chemical and electrical properties.

---

This invention relates to curable polyepoxide compositions containing an acid anhydride as a curing agent and piperidine as an accelerator and to cured products obtained therefrom. More particularly, this invention relates to homogeneous polyepoxide compositions, containing an acid anhydride as a curing agent and piperidine as an accelerator, which are relatively stable at room temperature and which will cure to infusible products in a relatively short period of time when heated at elevated temperatures, generally in excess of about 100° C., to products which are characterized by excellent chemical, physical and electrical properties.

In the past, attempts to formulate polyepoxide compositions using acid anhydride curing agents and secondary amine accelerators have not been particularly successful due to the tendency of the compositions to separate into two distinct phases. As an illustration, admixing methyl tetrahydrophthalic acid anhydride with diglycidyl-ether of 2,2-bis(p-hydroxyphenyl)propane and adding dimethylamine thereto has resulted in a two-phase composition with the dimethylamine "salting out" as a separate phase. Obviously, such a non-homogeneous composition, when cured, is characterized by poor physical, chemical and electrical properties.

The present invention provides homogeneous polyepoxide compositions, containing an acid anhydride as a curing agent and piperidine as an accelerator, which are relatively stable at room temperature and which will cure to infusible products in a relatively short period of time, when heated at elevated temperatures, to products which are characterized by excellent properties.

The curable, homogeneous polyepoxide compositions of this invention comprise a polyepoxide having an epoxy equivalency of greater than one, an anhydride of a polycarboxylic acid and piperidine.

The polyepoxides suitable for purposes of this invention are those organic compounds having an oxirane epoxy equivalency of greater than one, that is, compounds having an average of more than one oxirane epoxy group, i.e.

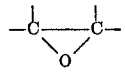

per molecule. These compounds, wherein the oxygen of the epoxy group is attached to vicinal carbon atoms, can be saturated or unsaturated, aliphatic, cycloaliphatic, or heterocyclic, and can be substituted with substituents such as halogen atoms, alkyl groups, ether groups and the like.

Illustrative of suitable polyepoxides are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al. U.S. Pat. 2,506,486 and polyphenylols such as the Novolac condensates of a phenol and a saturated or unsaturated aldehyde containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. Pat 2,885,385 to A. G. Farnham. The phenols may contain such substituents as alkyl or halogens, as exemplified by the alkyl resorcinols, tribromoresorcinol, and the bisphenols containing alkyl and halogen substituents on the aromatic ring (Bender et al., U.S. Pat. 2,506,486). The polyhydric polynuclear phenols can consist of two or more phenols connected by such groups as methylene, alkylene or sulfone. The connecting groups are further exemplified by bis(p-hydroxyphenyl) methane, 2,2-bis(p-hydroxyphenyl) propane and dihydroxydiphenylsulfone.

Process for the preparation of polyglycidyl ethers of polyhydric phenols is described in detail in the Bender et al. patent (supra) and U.S. Pat. 2,943,095 to A. G. Farnham et al.

Particularly desirable for purposes of this invention are the polyglycidyl ethers of the bis(hydroxyphenyl) alkanes, for example, the diglycidyl ether of 2,2-bis(p-hydroxyphenyl)propane, and the diglycidyl ether of bis(p-hydroxyphenyl)methane. Other suitable polyglycidyl ethers of polyhydric phenols are enumerated in U.S. Pat. 2,633,458 to E. C. Shokal.

Also suitable are the polyglycidyl ethers of polyhydric alcohols, such as the reaction products of epichlorohydrin and aliphatic compounds containing from two to four alcoholic hydroxyl groups, such as ethylene glycol, propane diols, butane diols, glycerine, hexane triols and the like. (Methods of preparing polyglycidyl ethers of polyhydric alcohols are described in U.S. Pat. 2,898,349 to P. Zuppinger et al.)

Other suitable polyglycidyl compounds are the polyglycidyl esters of adipic acid, phthalic acid and the like. Polyglycidyl esters of polycarboxylic acids are described in detail in U.S. Pat. 2,870,170 to Payne et al. Also suitable are polyglycidyl compounds produced by reacting epichlorohydrin with aromatic amines, such as aniline, 2,6-dimethylaniline, p-toluidine, m-chloroaniline, p-aminodiphenyl, m-phenylene diamine, p-phenylene diamine, 4,4'-diaminodiphenyl methane, or with amino phenols such as p-amino phenol, 5-amino-1-n-naphthol, 4-amino phenol, 2-chloro-4-amino phenol and the like. Specific compounds include among others, N,N-diglycidyl aniline, N,N-diglycidyl-2, 6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups.

Polyglycidyl derivatives of aromatic amines and amino phenols and methods for their preparation are further described in U.S. Pat. 2,951,825 and 2,951,822 to N. H. Reinking and N. H. Reinking et al., respectively.

The so-called peracetic acid epoxides which are obtained by epoxidation across a double bond, such as bis-(2,3 - epoxycyclopentyl)ether, 3,4 - epoxy-cyclohexyl-methyl-3, 4-epoxycyclohexane carboxylate, vinylcyclohexene dioxide, dicyclopentadienedioxide and the like are also suitable.

Among suitable anhydrides of polycarboxylic acids can be noted the anhydrides of polycarboxylic acids having the formula: HOOC—A—COOH wherein A is a divalent, hydrocarbon radical, generally having a maximum of 14 carbon atoms, as for example an alkylene radical having 1 to 9 carbon atoms inclusive, preferably 4 to 6 carbon atoms inclusive, or a phenylene or alicyclic radical having 4 to 14 carbon atoms, preferably 6 to 10 carbon atoms inclusive.

Exemplary of suitable acids are the following: malonic, succinic, glutaric, adipic, pimelic, suberic, azelaic, sebacic, maleic, phthalic, methyltetrahydrophthalic, tetrahydrophthalic, hexahydrophthalic, methylhexahydrophthalic, nadic (methylendomethylenetetrahydrophthalic acid) and the like.

Additional acids, the anhydrides of which are suitable for purposes of this invention are enumerated in U.S. Pat. 2,918,444 to B. Phillips et al. Mixtures of the anhydrides can be used if so desired.

The amount of acid anhydride suitable for purposes of this invention ranges from about 0.5 percent of stoichiometric to about 1.5 percent in excess of stoichiometric. It is preferred to use about 0.65 percent of the stoichiometric amount to about 1.5 in excess of the stoichiometric amount. For purposes of stoichiometric calculations, one anhydride group is deemed to react with one epoxy group.

Piperidine is used in amounts of about 0.1 percent by weight to about 5.0 percent by weight based on the weight of the polyepoxide and preferably about 1.0 percent by weight to about 2.5 percent by weight based on the weight of the polyepoxide.

In the formulation of the compositions of this invention, it is essential that the piperidine be blended with the polyepoxide and the acid anhydride then blended with the resultant mixture. By utilizing this procedure, there is no separation of the composition into multiphase layers.

The polyepoxide compositions of this invention are cured by being heated at elevated temperatures, generally on the order of about 75° C. to about 200° C. for about 1 to 24 hours. The exact cycle will vary and depend upon the formulation of the composition.

Additional materials such as fillers, pigments, fibers, dyes and the like can be added to the polyepoxide compositions of this invention, if so desired.

The following examples further illustrate the present invention and are not intended to limit the scope thereof in any manner.

EXAMPLE 1

A composition having the following formulation:

100 grams of diglycidylether of 2,2-bis(p-hydroxyphenyl)propane having an epoxy equivalency of 181
2 grams of piperidine
85 grams of methyl-endomethylene tetrahydrophthalic anhydride was prepared by admixing the piperidine with the diglycidylether and then admixing the methyl nadic anhydride therewith.

EXAMPLE 2

A composition having the following formulation:

100 grams of the diglycidylether of Example 1
2 grams of piperidine
85 grams of methyl-tetrahydrophthalic anhydride was prepared by admixing the piperidine with the diglycidylether and then admixing the methyl-tetrahydrophthalic anhydride therewith.

Castings were formed from the compositions of Example 1 and Example 2 by subjecting these compositions to the following curing cycle:

2 hours at 100° C.
6 hours at 160° C.

The castings were then used in the tests which are noted below. Test result relative to these tests are also tabulated below.

| | Compositions of— | |
|---|---|---|
| | Example 1 | Example 2 |
| Tensile strength ASTMD-638-64T, p.s.i. | 12,500 | 12,131 |
| Tensile modulus ASTMD-638-64T, p.s.i. | 0.44×10⁶ | 0.40×10⁶ |
| Elongation ASTMD-638-64T, percent | 4.8 | 5.6 |
| Flexural strength ASTMD-790-66, p.s.i. | 18,100 | 19,300 |
| Heat distortion temperature ASTMD-648-56, °C. | 150 | 129 |
| Arc resistance ASTMD-495-61, sec. | 76 | 90 |
| Dielectric strength ASTMD-149-64 | 411 | 425 |
| Volume resistivity ASTMD-257-61, meg. ohm-cm. | 159×10⁹ | 177×10⁹ |
| Surface resistivity, meg. ohms | 4.97×10¹⁰ | 4.97×10¹⁰ |

Volume resistivity and surface resistivity were determined at a temperature of 73° F. and at a relative humidity of 50 percent.

Compositions of Example 1 and of Example 2 were used to prepare glass laminates. The laminates were prepared as follows: The composition, to be used as the impregnating material, was placed in a flat, shallow pan which was slightly larger in area than the laminate to be produced. A stack of 12 plies of glass cloth was placed on top of the composition and the composition was allowed to soak up through to the plies. When all of the plies were thoroughly saturated, the impregnated plies were sealed in an envelope of a release film and wiped out to remove any entrapped air. The impregnated plies, while in the envelope, were pressed to ⅛-inch stops for one hour at a temperature of 120° C. and for one hour at a temperature of 160° C. The laminate was then post cured for five hours in an oven which was at a temperature of 160° C. Laminates prepared by this procedure were subjected to the tests which are noted below.

| | Composition of— | |
|---|---|---|
| | Example 1 | Example 2 |
| Flexural strength at room temperature ASTMD-790-66, p.s.i. | 75,800 | 81,500 |
| Flexural modulus at room temperature ASTMD-790-66, p.s.i. | 3.15×10⁶ | 3.32×10⁶ |
| Flexural strength at 160° F. ASTMD-790-66, p.s.i. | 72,300 | 71,700 |
| Flexural Modulus at 160° F. ASTMD-790-66, p.s.i. | 3.16×10⁶ | 3.15×10⁶ |
| Flexural Strength at 300° F. ASTMD-790-66, p.s.i. | 55,900 | 16,500 |
| Flexural Modulus at 300° F. ASTMD-790-66, p.s.i. | 2.73×10⁶ | 1.06×10⁶ |
| Tensile Strength ASTMD-638-64T, p.s.i. | 56,100 | 61,000 |
| Tensile modulus ASTMD-638-64T, p.s.i. | 2.78×10⁶ | 2.98×10⁶ |
| Edgewise Compressive strength ASTMD-695-63T, p.s.i. | 52,900 | 54,500 |
| Edgewise Compressive modulus ASTMD-695-63T, p.s.i. | 3.35×10⁶ | 3.51×10⁶ |

It is to be understood that the disclosure of all patents and literature references noted are incorporated herein by reference.

What is claimed is:

1. Process for preparing a curable homogeneous composition which comprises admixing piperidine with a polyepoxide having an average of more than one oxirane epoxy group and adding thereto an acid anhydride wherein the piperidine is used in amounts of about 0.1 percent to about 5 percent by weight based on the weight of the polyepoxide and the polycarboxylic acid anhydride is is used in amounts of about 0.5 percent of stoichiometric to about 1.5 percent in excess of stoichiometric.

2. A curable homogeneous composition comprising a polyepoxide having an average of more than one oxirane epoxy group, an acid anhydride hardener and piperidine, said composition prepared as defined in claim 1.

3. A curable composition as defined in claim 2 wherein the polyepoxide is a polyglycidylether of a polyhydric phenol.

4. A curable composition as defined in claim 2 wherein the polyepoxide is diglycidylether of 2,2-bis(p-hydroxyphenyl)-propane.

5. A curable composition as defined in claim 2 wherein the polycarboxylic acid anhydride is methyl-endomethylene tetrahydrophthalic anhydride.

6. A curable composition as defined in claim 2 wherein the polycarboxylic acid anhydride is methyltetrahydrophthalic anhydride.

7. A curable composition as defined in claim 2 wherein the polyepoxide is diglycidylether of 2,2-bis (p-hydroxyphenyl)-propane and the polycarboxylic acid anhydride is methyl-tetrahydrophthalic anhydride.

8. A curable composition as defined in claim 2 wherein the polyepoxide is diglycidyl ether of 2,2-bis(p-hydroxyphenyl)-propane and the polycarboxylic acid anhydride is methyl-endomethylene tetrahydrophthalic anhydride.

References Cited

UNITED STATES PATENTS

| | | | |
|---|---|---|---|
| 3,018,258 | 1/1962 | Meier et al. | 260—6 |
| 3,052,650 | 9/1962 | Wear et al. | 260—47 |
| 3,201,360 | 8/1965 | Proops et al. | 260—18 |
| 3,301,795 | 1/1967 | Wooster | 260—2 |

WILLIAM SHORT, Primary Examiner

E. A. NEILSEN, Assistant Examiner

U.S. Cl. X.R.

260—2, 78.4

PO-1050
(5/69)

UNITED STATES PATENT OFFICE
CERTIFICATE OF CORRECTION

Patent No. 3,539,532  Dated November 10, 1970

Inventor(x) James R. Harvey

It is certified that error appears in the above-identified patent and that said Letters Patent are hereby corrected as shown below:

Column 4, line 65; "an acid anhydride" should read -- a poly carboxylic acid anhydride --.

Column 4, line 73; "an acid anhydride" should read -- a poly carboxylic acid anhydride --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents